Aug. 19, 1958 J. R. COONEY 2,848,540
CARRIER-WAVE TRANSMITTING AND RECEIVING APPARATUS
Filed Feb. 16, 1953
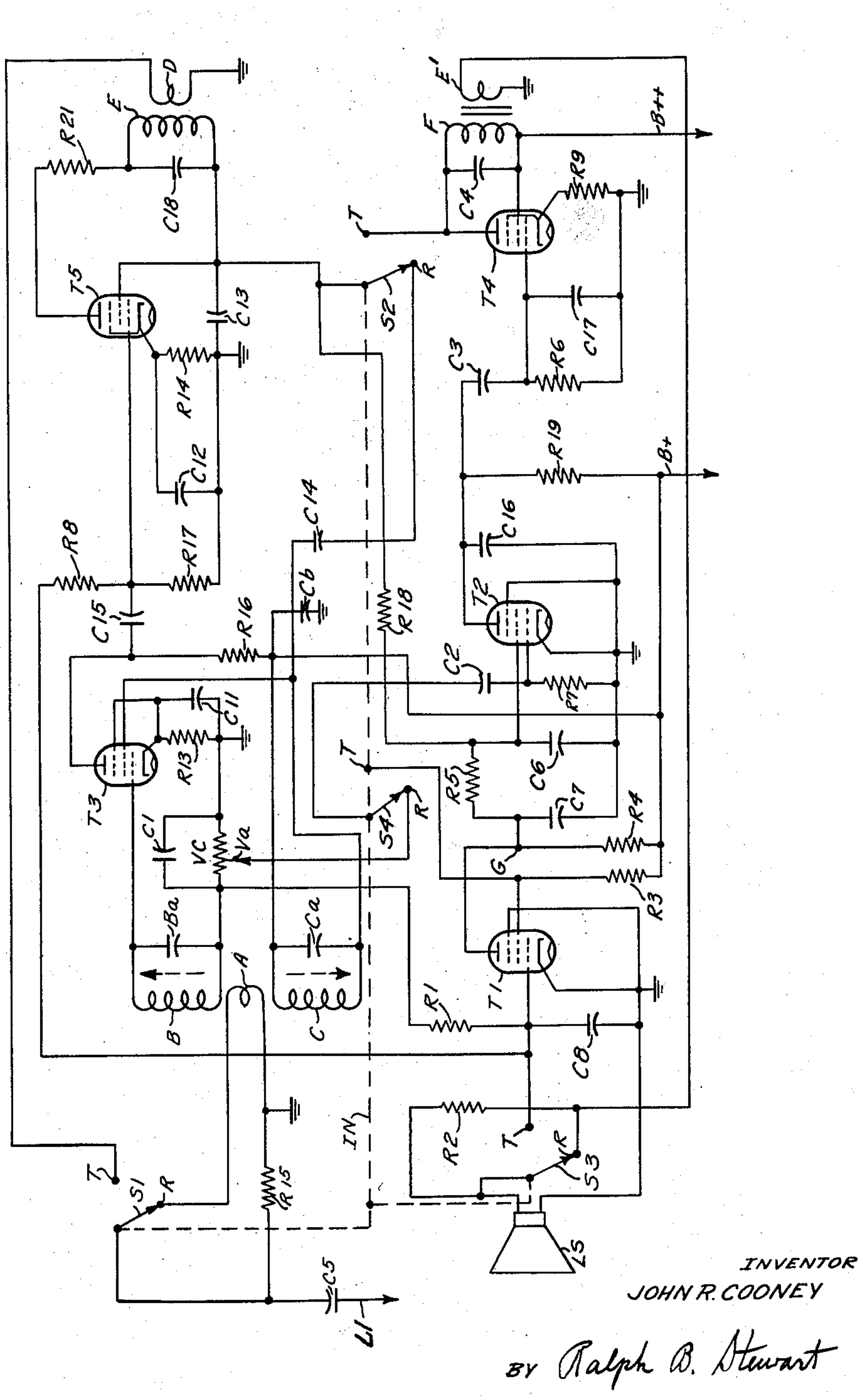
INVENTOR
JOHN R. COONEY
BY Ralph B. Stewart
ATTORNEY United States Patent Office 2,848,540 Patented Aug. 19, 1958

2,848,540

CARRIER-WAVE TRANSMITTING AND RECEIVING APPARATUS

John R. Cooney, Waldoboro, Maine

Application February 16, 1953, Serial No. 336,995

16 Claims. (Cl. 179—2.5)

This invention relates to intercommunication systems of the type in which a signal is transmitted as a modulation on a carrier wave of super-audible frequency.

While the form of the invention to be described herein is especially adapted for use in so-called "wired radio" systems, where the carrier wave is transmitted over a power-supply system between two points of communication on the same system, it is not limited to such use and is equally useful in radio systems where the carrier wave is transmitted in free space between the two signaling stations.

In wired radio systems of the type concerned, it is customary to embody both transmitting and receiving apparatus in a single set which is energized from the power-supply system, and the set is commonly referred to as a "transceiver." It is also customary to provide a transmit-receive switch for quickly converting the set for use as a transmitter or a receiver, and to arrange the set so that one or more elements serve functions both during transmission and reception.

A broad general object of the present invention is to devise a transceiver to provide satisfactory service under especially difficult conditions, such as unusually long distances between stations, or unfavorable line characteristics. This object is accomplished in part by the use of a master-oscillator, power-amplifier combination in the transmitting circuit, for greatly increased stability and power, the use of a radio-frequency amplifier during reception, and a special receiving circuit providing high sensitivity to weak signals.

A further object is to devise a transceiver in which the component elements are utilized to a high degree of efficiency, that is, they serve a maximum number of functions on transmission and reception.

One of the difficulties in the use of transceivers on wired radio systems is the interference caused by various sources of noise pulses, such as those produced by electrical equipment connected to the power-supply system. My present invention involves a noise-suppression circuit in which an amplifier of the receiver is normally biased to cut-off in the absence of a received carrier wave and is rendered operative by the energy of an incoming carrier wave. The noise-suppression circuit functions to prevent amplification of the rather widely spaced noise pulses during periods when no carrier wave is being received.

Another difficulty in the operation of transceivers on power-line circuits is due to the large difference in signal magnitudes which are encountered under different conditions. For example, the magnitude of the received signal at the grid of the input tube may vary from 100 volts where the transmitting and receiving sets are located near each other, down to only a fraction of a volt where they are spaced a considerable distance from each other or are connected over a line of poor transmission characteristic. Under such conditions, the sets heretofore used do not operate properly, especially if they involve the amplification of radio-frequency energy.

Another object of the present invention is to devise an improved receiving arrangement for securing satisfactory operation over a wide range of signal amplitude variation. Specifically, my invention provides one detector circuit which functions as the principal detector for signals having an amplitude within a certain high-level range, and a second detector circuit which functions as the principal detector for signals having amplitude within ertain low-lever range, both circuits serving as detectors within the overlapping or intermediate range of amplitudes.

A further object of the invention is to devise a transceiver in which a single volume control potentiometer is used in connection with both detector circuits.

The accompanying drawing is a circuit diagram of the preferred arrangement of a transceiver according to my invention.

The common input and output line for the set is shown at L1. This line is connected to an antenna for radio transmission or to a transmission line network for wired-radio use. In the latter case a series condenser C5 is included to isolate the set from the network with respect to direct and low frequency currents. The line L1 is connected to a two-position switch S1 having a receiving contact R and a transmitting contact T. In the receiving position switch S1 connects line L1 to the primary winding A of a radio-frequency transformer having secondary windings B and C. In the "transmit" position, switch S1 connects line L1 to the secondary winding D of a transformer having a primary winding E included in the anode circuit of a power-amplifier tube T5 which may be a pentode of the type 50B5. A suitable loading resistance R15 is connected between the line L1 and the grounded side of winding A.

Winding B is shunted by a condenser B*a* to form a parallel circuit which is tuned to the frequency of the carrier wave. This tuned circuit is connected between the cathode and control grid of electron tube T3 which may be a pentode of type 12AU6. A volume control resistor VC is interposed between the cathode and the tuned circuit and is shunted by a condenser C1. A grounded biasing resistor R13 shunted by a condenser C11 is included in the cathode lead of tube T3. The suppressor grid of tube T3 is maintained at cathode potential. The anode of tube T3 is connected to the plate current supply line B+ through a resistance R16. The screen grid of tube T3 is connected to plate supply line B+ through transformer coil C, which is shunted by a condenser C*a* to form a parallel circuit which also is tuned to the frequency of the carrier wave. Thus, the screen grid of tube T3 receives the full voltage of the line B+, while the plate of tube T3 receives a lower voltage through resistor R16.

The anode of tube T3 is coupled to the control grid of pentode T5 through a coupling condenser C15. A grounded biasing resistor R14 shunted by a condenser C12 is included in the cathode lead of tube T5. A high resistance R17 connects the control grid of tube T5 to the grounded end of resistor R14. The suppressor grid of tube T5 is maintained at cathode potential. The screen grid of tube T5 is connected to plate current supply line B++ through the transmitting contact T of a two-position switch S2 and through the primary winding F of an audio-frequency transformer connected in the anode circuit of tube T4 which may be a pentode of the type 50B5. The anode of tube T5 is connected to supply line B++ through a resistor R21, and primary winding E, through switch S2 and through primary winding F. Supply line B++ is at a higher voltage than line B+. Primary winding E is tuned to the carrier frequency by a shunt condenser C18. A by-pass condenser C13 effectively grounds the screen grid of tube T5 and the terminal of winding E connected to this grid. A by-pass condenser C14 is connected between the R contact of switch S2 and the terminal of coil C which is connected to the screen grid of tube T3. Thus, when the switch S2 is in the receiving position, the winding C is shunted by condensers C13 and C14 connected in series, it being understood that the supply line B+ is effectively grounded through the filter condensers of the plate supply source. This is represented by the condenser C*b* connected to the line B+ leading to the upper end of winding C.

The ungrounded end of volume control resistor VC is connected to the control grid of electron tube T1 which may be a pentode of type 12AU6, a resistor R1 being included in the connection. A condenser C8 is connected between the control grid and the cathode of tube T1. A loud-speaker LS, which may be operated either as a microphone or a loud-speaker, is connected between the cathode and a two-position switch S3 having contacts T and R for transmitting and receiving respectively. The T contact of switch S3 is connected to the control grid of tube T1, while the R contact is connected to winding E′ of the transformer connected in the plate circuit of tube T4, the other terminal of winding E′ being grounded. A resistance R2 is connected between the switch blade S3 and the terminal R. Transformer winding E′ is poled in the proper direction to provide negative feedback to loud-speaker LS in the transmitting position of switch S3. The screen grid of tube T1 is connected to supply line B+ through resistor R3, and the anode of this tube is connected to the same supply line through resistor R4.

The anode of tube T1 is coupled to the screen grid of amplifier tube T2 through a series resistor R5 having shunt condensers C6 and C7 connected from the terminals thereof to ground. Tube T3 may be of the same type as tube T1. The sliding contact V*a* of the volume control VC is connected to the receiving contact R of a two-position switch S4 which is connected to the control grid of tube T2 through blocking condenser C2. A high resistance R7 is connected between the control grid and the cathode of tube T2. The transmitting contact T of switch S4 is connected directly to the screen grid of squelch tube T1.

The anode of tube T2 is coupled to the control grid of tube T4 through a series coupling condenser C3, the control grid of tube T4 being connected to ground through a high resistance R6 shunted by condenser C17. A grounded biasing resistor R9 is connected in the cathode lead of tube T4, and the screen grid of this tube is connected directly to supply line B++. The anode of tube T2 is connected to supply line B+ through resistance R19 and is effectively grounded with respect to high-frequency waves by condenser C16. Transformer winding F is by-passed for high-frequency currents by condenser C4. In the transmit position of switch S2, voltage is applied from line B++ to the screen grid of tube T2 through a high resistance R18.

It will be understood that the various ground connections shown in the drawing represent connections to the chassis of the set which does not require actual grounding.

Switches S1 to S4 inclusive are mechanically interlocked by suitable means represented by the dotted lines IN so that they may be moved simultaneously from one position to the other. The drawing shows all of the switches in the "R" or receiving position.

In the receiving position of the set, the received waves are applied to the coupling coil A through switch S1 and this coil induces oscillations in the tuned circuit B—B*a*. The tuned circuit C—C*a* is short-circuited through condensers C*b*, C13 and C14 by means of switch S2. This prevents tube T3 from acting as an oscillator. Switch S3 connects the loudspeaker LS directly across the transformer winding E. Switch S4 connects the variable tap V*a* of the volume control to the control grid of amplifier tube T2.

Oscillations of high-level amplitude are rectified by diode action between the control grid and the cathode of tube T3, and the rectified signals are applied to the control grid of amplifier T2 through switch S4. Unless the signal should be nearly 100% modulated, the amplifier tube T3 will function completely saturated for all signals within this range and the voltage appearing across C8 from the output of this tube will be a pure or constant D. C. voltage. The amplifier detected signals from T2 are further amplified in tube T4 and supplied through transformer windings F and E to the loud-speaker LS.

When signals of low amplitude are received, tube T3 operates as a linear amplifier and supplies amplified oscillations to the grid circuit of tube T5 where these amplified oscillations are rectified by diode action between the control grid and the cathode of this tube. The rectified signals are supplied through resistance R8 to condenser C8 connected between the control grid and the cathode of tube T1. A portion of the signal voltage across C8 is impressed across volume control VC through resistor R1, and is then supplied to the control grid of amplifier T2.

From the foregoing it will be seen that in the case of received signals of very high level, they are rectified by diode action of tube T3 and are supplied from the volume control VC directly to the control grid of the audio amplifier T2, whereas in the case of signals of very low level, they are first amplified at radio frequency by the tube T3 and are then rectified by diode action of tube T5 and supplied to volume control VC before going to amplifier T2. Thus, tube T3 functions as the principal detector of signals of high level and tube T5 is the principal detector of signals of low level. For example, tube T3 will serve as the principal detector for signals having amplitudes ranging from 100 volts at its control grid down to about 3 volts peak, while tube T5 acts as the principal detector for signals having amplitudes of 3 volts and lower.

There is a certain range of signal levels over which both detector tubes or circuits contribute to the detected signal supplied to the input of the main amplifier tube T2. At high levels of amplitude, the tube T3 operates at full saturation and the rectified voltage appearing across condenser C8 is a direct current voltage which remains substantially constant at around 10 volts maximum, and no appreciable detected signal is present across C8. When the amplitude level drops down and approaches 5 volts, the tube T3 begins to act as a linear amplifier during the low portions of the modulation cycle and a rectified signal component is applied across the input of tube T1 by diode action of tube T5. A portion of this rectified signal is applied across the volume control resistor VC through resistance R1, and in this way part of the signal rectified by tube T5 is mixed with the signal rectified by tube T3 in the volume control resistor. With this arrangement, the single volume control is effective for all values of signal level.

For still smaller signals, grid current no longer flows at all in T3, which now functions as a straight "class A" R. F. amplifier, a portion of the rectified output of which now contributes the whole audio signal appearing across the volume control VC. However, because this rectified voltage is still applied to the grid of T3, it comprises a form of instantaneous AVC, which reduces the effective modulation percentage, and also the gain of the stage for larger signals, and does not allow the full gain of the stage to come into play except for very small signals.

In effect then, the composite detecting system responds linearly as a straight diode detector to large signals, down to 4 or 5 volts. In this vicinity it crosses over to an R. F. amplifier with diode-detected output. For small signals ranging from 2 volts down to about .1 volt the output tapers off very gradually because of the D. C. feedback to the grid of T3, in an exponential curve. When the signal decreases below a certain lower limit, insufficient voltage becomes available at the grid of control tube T1 to maintain the amplifier T2 in an operative condition, and the receiver keys "off."

A slight distortion in the cross-over region of the detector system may be kept to a minimum by properly proportioning the values of resistors R1 and VC. It is preferred that R1 be about twice the value of VC so that about ⅓ the voltage of C8 is impressed across the volume control VC.

When the switches S1 to S4 are moved to the transmitting position, switch S1 connects the line L1, which now serves as an output line, to the secondary transformer winding D. The switch S2 removes the short circuit from around the winding C, connects the anode circuit of tube T5 in series with the anode circuit of amplifier tube T4, and applies voltage to the screen grid of tube T2. Switch S4 connects the control grid of amplifier tube T2 to the screen grid of amplifier tube T1, and switch S3 connects loudspeaker LS to the control grid of the pre-amplifier tube T1.

During transmitting operation, tube T3 operates as an electron-coupled oscillator and generates a carrier wave of the desired frequency which is supplied through condenser C15 to the grid of power amplifier tube T5. The output of this amplifier is modulated in accordance with the output of loudspeaker LS which is amplified through the three-stage amplifier formed of tubes T1, T2 and T4. It will be noted that the last stage of the amplifier serves to modulate the voltage supplied to the screen grid of tube T5. The modulated output of tube T5 is supplied to the outgoing line L1 through transformer windings E and D. During transmission, the grid, cathode and screen grid and plate of the tube T1 function as a triode amplifying stage of the three-stage amplifier interposed between the loudspeaker LS and amplifier-modulator tube T5.

It is desirable to bias the transmit-receive switch to the receiving position when the transceivers are not in use, and the sets will then respond to static or other noise pulses originating from various sources. For the purpose of preventing interference from such noise pulses, the electron tube T1 is employed as a squelch tube to normally block amplifier tube T2 at times when no carrier wave is being received.

The noise suppressor circuit involves blanking means for normally maintaining one of the receiving amplifier tubes inoperative, and a carrier-operated storage device for overcoming the effect of the blanking means and rendering the amplifier tube operative. The blanking may be accomplished in a number of known ways, such as by controlling the bias on the control grid of the amplifier tube, or by reducing the voltage on the plate of the tube or on the screen grid of a multigrid tube. In the arrangement illustrated, the blanking is accomplished by reducing the voltage on the screen grid of the amplifier tube T2.

The blanking arrangement for amplifier tube T2 includes tube T1 which is a sharp cut-off high mutual conductance pentode. With no radio frequency signal being detected by tube T3, the control grid of tube T1 will be at a slight negative potential with respect to ground. The screen grid of tube T1, however, is maintained at a relatively high potential since it is connected directly to the positive side of the power supply through a resistor R3. For this reason, plate current will flow regardless of low plate potential, and the voltage at point G is maintained at or slightly below zero. This point is connected to the screen grid of audio amplifier T2 and this tube will not operate as an amplifier with zero screen potential. Thus, with no incoming carrier wave present, amplifier tube T2 is maintained cut-off or blocked. With the appearance of a radio frequency carrier, a negative voltage drop is produced across VC by the tube T3, functioning as a detector. This voltage is, of course, proportional to the envelope of the modulated carrier. As long as the carrier is not overmodulated, the control grid of tube T1 may be made sufficiently negative to be maintained steadily well below cut-off. Under these conditions, i. e., with tube T1 at cut-off, condenser C7 will charge positively through resistor R4 and the potential of the screen grid of tube T2 will rise in a positive direction to a point where this tube can function as an amplifier. The time constant of resistor R4 and condenser C7 may be of the order of 0.05 seconds and is relatively long with respect to the time constant of VC—C1.

In the absence of a carrier-wave signal, a series of voltage impulses, such as might be produced by electrical disturbances on the power line, will produce a series of damped trains, of a few radio frequency cycles duration each, in tuned circuit B—B*a*. With the time constant of resistor VC and condenser C1 of the order of 0.00005 second, unindirectional negative pulses appear at point V*a*, and these pulses decay rather rapidly, that is, the decay time is so fast as generally to reach zero before the next pulse appears, even at high repetition frequencies well up in the high audio range. While these pulses cut off tube T1 for the duration of each pulse, and thus allow condenser C7 to start charging, the instant the pulse reaches zero, condenser C7 discharges quickly through the low resistance of tube T1. Since the time constant of resistor R4-condenser C7 is very long compared to the duration of the noise pulse, the screen grid of tube T2 is not raised in potential enough to allow tube T2 to function as an amplifier. The net result is that the screen of tube T2 remains substantially at zero potential for most noise voltages which appear on the power line, or for most static pulses, but this potential rises and stays at a substantial value for a modulated carrier wave, so long as the latter is not in the vicinity of 100% modulated. Thus tube T1 and its circuit normally holds tube T2 in a dead or blocked condition, by keeping its screen voltage substantially at zero in the absence of a received carrier, and it responds to an incoming carrier to render tube T2 operative after the carrier has continued for a certain time. In this arrangement, condenser C7 is a storage condenser and provides a controlling potential for tube T2, which potential continuously increases in response to the receipt of a carrier wave but which reduces to zero between noise impulses.

It will be advantageous in securing complete blanking of tube T2 to use a small positive cathode bias on this tube so that its screen will be driven below zero when current flows in tube T1. The network formed of resistors R4 and R5 and condensers C7 and C6 serves to filter out any audio-frequency voltage which may appear at G when a weak carrier, somewhere near the threshold value for operation of the system, is present. If relatively large carrier amplitudes are consistently to be expected, the second filter stage R5—C6 may be omitted, and the screen of tube T2 will be connected directly to the plate of tube T1.

By way of illustration, the principal circuit constants for a transceiver designed for operation on a carrier wave of 175 kilocycles per second will be given. Volume control resistor VC is one-half megohm and condenser C1 is of 100 mmfd. Resistance R8 is 270,000 ohms and condensers C8 and C15 are of 250 mmfd. each. Resistance R4 is of 470,000 ohms and condenser C7 is 0.1 mmfd. R5 is 470,000 ohms and C6 is 0.05 mmfd. R1 and R18 are one megohm each. R13 and R14 are 470 ohms each, and the condensers C11 and C12 are 0.05 mmfd. each.

In the example given herein, the time constant of the circuit for charging condenser C7 is of the order of 0.05 second, which must be relatively long in comparison with the time constant of the network V*c*—C1 (0.00005 second). These particular values are given for a system using a fairly low carrier frequency. Where the carrier is of a higher frequency it is possible to reduce the time constant of the network V*c*—C1 to a much lower value and correspondingly reduce the time constant of the charging circuit R4—C7. With a sufficiently short time constant for the charging circuit, it is possible to cause the audio system to be turned on and off relatively quickly, even fast enough to follow the dots and dashes of a code signal transmitted by continuous wave pulses.

From the foregoing it will be seen that all five electron tubes in the transceiver are used for both transmission and reception.

Tube T1 amplifies the signal from microphone LS on transmission and serves as a squelch tube for blocking tube T2 between transmission periods when no carrier is received.

Tube T2 functions as a second-stage amplifier of the microphone signal during transmission, and it amplifies the detected signal from the volume control VC during reception.

Tube T3 functions as an electron-coupled oscillator during transmission, and it operates as a combined diode detector and RF amplifier during reception. High level signals are detected by diode action between the control grid and the cathode, and the tube acts as a "Class A" R. F. amplifier for low level signals.

Tube T4 modulates the screen grid voltage of power amplifier T5 according to the microphone signals during transmission, and it constitutes the final audio amplifier stage for the detected signal during reception.

Tube T5 operates as a radio frequency power amplifier during transmission, and it functions as a diode detector for low level signals which are amplified by tube T3 during reception.

I claim:

1. A receiver for amplitude-modulated carrier wave signals of widely varying levels comprising, a receiving circuit, an electron tube amplifier having a cathode, a control grid and an anode, an output circuit connected between said cathode and the anode element of the tube, an input circuit coupling said receiving circuit to said electron tube and embodying means to effect rectification of said carrier wave signals by diode action between said grid and said cathode, a resistance in said input circuit traversed by detected signal current, a rectifier circuit connected to rectify the amplified waves in said output circuit, a connection from said rectifier to said resistance for supplying detected signals from said rectifier circuit to said resistance, and a common detected-signal output circuit connected across at least a portion of said resistance.

2. A receiver for amplitude-modulated carrier wave signals of widely varying levels comprising, a receiving circuit, an electron tube amplifier having a cathode, a control grid and an anode, and an output circuit connected between said cathode and the anode element of the tube, an input circuit coupling said receiving circuit to said electron tube and including means to effect rectification of said carrier wave signals by diode action between said grid and said cathode, means biasing said control grid negatively with respect to said cathode whereby waves below a certain level are not rectified in said input circuit but are amplified by said amplifier, a resistance in said input circuit traversed by detected signal current, a rectifier circuit connected to rectify the amplified waves in said output circuit, a connection from said rectifier to said resistance for supplying detected signals from said rectifier circuit to said resistance, and a common detected-signal output circuit connected across at least a portion of said resistance.

3. A receiver for amplitude-modulated carrier-wave signals of widely varying levels comprising, a receiving circuit, an electron tube amplifier having an input circuit and an output circuit, means coupling said receiving circuit to said input circuit to effect rectification of said received carrier-wave signals in said input circuit, a resistance in said input circuit traversed by detected signal current, a detector coupled to the output circuit of said amplifier, a connection for supplying detected signals from said detector to said resistance, and a common detected-signal output circuit connected across at least a portion of said resistance.

4. A receiver for amplitude-modulated carrier-wave signals of widely varying levels comprising a receiving circuit, a first detector circuit connected to said receiving circuit and responding principally to carrier waves of high level, a second detector circuit connected to said receiving circuit and responding principally to carrier-waves of low level, an amplifier having connections from its input circuit for receiving detected signals from both of said detector circuits, blanking means normally maintaining said amplifier inoperative, voltage-responsive means separate from said amplifier for operating said blanking means to render said amplifier operative, and connections from both of said detector circuits to control said voltage-responsive means in response to voltage of detected carrier-wave energy in either detector circuit.

5. A receiver for amplitude-modulated carrier-wave signals of widely varying levels comprising a receiving circuit, a first detector circuit connected to said receiving circuit and responding principally to amplitude-modulated carrier waves of high level, a second detector circuit connected to said receiving circuit and responding principally to amplitude-modulated carrier waves of low level, an amplifier having connections from its input circuit for receiving detected signals from both of said detector circuits, a grid-controlled electron tube connected to said amplifier and normally blanking said amplifier, and means including a high resistance connection from both of said detector circuits to the grid of said blanking tube for rendering said amplifier operative in response to detected carrier-wave energy in either detector circuit.

6. A receiver for amplitude-modulated carrier-wave signals of widely varying levels comprising a receiving circuit, a first detector circuit connected to said receiving circuit and responding principally to carrier waves of high level, a second detector circuit connected to said receiving circuit and responding principally to carrier waves of low level, an electron tube amplifier separately distinct from said detector circuits and having connections from its input circuit for receiving detected signals from both of said detector circuits, a blanking device including a source of voltage connected to one electrode of said amplifier and serving normally to maintain said amplifier inoperative, a potential storage condenser connected to an electrode of said amplifier in a direction tending to render said amplifier operative, a charging circuit connecting said condenser to a source of charging voltage through a resistance of relatively high value, a discharging circuit connected directly across said condenser and including a voltage-responsive variable resistance device separate from said electron tube amplifier and normally having a resistance value which is relatively low with respect to the resistance of said charging circuit, and means including a connection from each of said detector circuits to said voltage-responsive resistance device and operating to increase the resistance of said device in response to detected carrier-wave energy in either detector circuit.

7. In a carrier wave signalling system, a receiving arrangement for receiving amplitude-modulated carrier wave signals of widely varying level and for discriminating against relatively widely spaced noise impulses received during non-signalling periods, said arrangement comprising a detector circuit of low time constant with respect to the interval between noise impulses for detecting the energy of carrier wave signals of high level and noise impulses, an electron tube amplifier having an input circuit energized by detected energy in said detector circuit, a second detector circuit of low time constant for amplifying and detecting amplitude-modulated received signals of low level, connections for supplying detected signals from said second detector circuit to the input circuit of said amplifier, blanking means normally maintaining said amplifier inoperative, a storage condenser connected to an electrode of said amplifier in a direction tending to render said amplifier operative, a charging circuit for said condenser having a relatively long time constant, a discharge path of low time constant connected across said condenser, voltage-responsive means separate from said amplifier for increasing the resistance of said discharge path, and connections from both of said detector circuits to control said voltage-responsive means in response to voltage of detected carrier-wave energy in either detector circuit.

8. A signalling system for both transmission and reception comprising a signalling circuit, an electron tube amplifier having an input circuit connected between a control grid and the cathode of a grid-controlled electron tube and an output circuit connected between said cathode and an anode element of the tube, means comprising said input circuit to effect rectification of received carrier wave signals by diode action between said grid and said cathode, a second electron tube amplifier having an input circuit connected between a control grid and a cathode of a second grid-controlled electron tube and an output circuit connected between said cathode and an anode of said second tube, means comprising the input circuit of said second amplifier to effect diode rectification of the signal waves amplified by said first amplifier, a common detected-signal circuit connected to both of said input circuits, a control switch having a transmitting position and a receiving position, means controlled by said switch for coupling said signalling circuit to the input circuit of said first amplifier in receiving position and to the output circuit of the second amplifier in transmitting position, second means controlled by said switch for de-energizing the output circuit of said second amplifier in receiving position and energizing said output circuit in transmitting position, and third means controlled by said switch in transmitting position for supplying unmodulated carrier waves to the input circuit of said first amplifier.

9. A signalling system according to claim 8 and including fourth means rendered effective by said switch in transmitting position for modulating the output of said second amplifier in accordance with signals to be transmitted.

10. A signalling system according to claim 9 wherein said fourth means comprises an audio frequency amplifier having its output connected to said second amplifier during transmission and its input connected to a microphone of the type which is capable of operation as a loud-speaker, and including fifth means controlled by said switch in receiving position to shift the connection of said microphone from the input to the output of said audio amplifier, and sixth means controlled by said switch in receiving position to shift connection of the input of said audio amplifier from said microphone to said common detected-signal circuit.

11. A signalling system according to claim 10 and including electron-tube blanking means rendered effective in the receiving position of said switch for blanking the operation of said audio amplifier, and a connection from each of said detector circuits to said blanking means for rendering said audio amplifier operative in response to detected carrier-wave energy in either detector circuit.

12. A signalling system according to claim 11 and including means controlled by said switch in transmitting position for effecting operation of said electron-tube blanking means as an amplifier stage between said microphone and said audio amplifier.

13. A signalling system for both transmission and reception comprising a signalling circuit, an electron tube amplifier having an input circuit connected between a control grid and the cathode of a grid-controlled electron tube and an output circuit connected between said cathode and an anode element of the tube, a second electron amplifier having an input circuit connected between a control grid and a cathode of a second grid-controlled electron tube and an output circuit connected between said cathode and an anode of said second tube, means comprising the input circuit of said second amplifier to effect diode rectification of the signal waves amplified by said first amplifier and applied between the grid and cathode of said second amplifier tube, a control switch having a transmitting position and a receiving position, means controlled by said switch for coupling said signalling circuit to the input circuit of said first amplifier in receiving position and to the output circuit of the second amplifier in transmitting position, second means controlled by said switch for deenergizing the output circuit of said second amplifier in receiving position and energizing said output circuit in transmitting position, and third means controlled by said switch in transmitting position for effecting operation of said first amplifier as a self-generator of carrier wave oscillations.

14. A carrier-wave signalling system for both transmission and reception comprising a signal circuit, a detector for detecting carrier wave signals received in said circuit, an audio frequency amplifier, a microphone, a control switch having a transmitting position and a receiving position, means controlled by said switch in receiving position for supplying detected signals from said detector to the input of said amplifier, electron-tube blanking means connected to said amplifier and normally blocking said amplifier, means including said detector for controlling said blanking means to unblock said amplifier in response to detected carrier wave energy, and means controlled by said switch in transmitting position for effecting operation of said electron-tube blanking means as an amplifier stage for supplying signals from said microphone to the input of said audio amplifier.

15. A signalling system according to claim 14 wherein said audio amplifier includes a pentode tube having its control grid connected to said detector, and said blanking means includes a second pentode having its anode conductively connected to the screen-grid of said first pentode, and means controlled by said switch in transmitting position for connecting the screen grid of the second pentode to the control grid of the first pentode.

16. A receiver for amplitude-modulated carrier wave signals of widely varying levels comprising, a receiving circuit, an electron tube amplifier having an input circuit connected between a control grid and the cathode of a grid-controlled electron tube and an output circuit connected between said cathode and an anode element of the tube, means energizing said input circuit from said receiving circuit, means comprising said input circuit to effect rectification of received carrier wave signals by diode action between said grid and said cathode, a second electron tube amplifier having an input circuit connected between a control grid and a cathode of a second grid-controlled electron tube and an output circuit connected between said cathode and an anode of said second tube, means for energizing the input circuit of said second ampliler from the output circuit of said first amplifier, means comprising the input circuit of said second amplifier to effect diode rectification of the signal waves amplified by said first amplifier, and a common detected-signal output circuit connected to receive detected signals from both of said input circuits.

References Cited in the file of this patent

UNITED STATES PATENTS

| | | |
|---|---|---|
| 1,981,342 | Black | Nov. 20, 1934 |
| 2,026,357 | Perkins | Dec. 31, 1935 |
| 2,086,465 | Brown | July 6, 1937 |
| 2,114,718 | Levy | Apr. 19, 1938 |
| 2,143,563 | Levy | Jan. 10, 1939 |
| 2,229,674 | Richards | Jan. 28, 1941 |
| 2,459,675 | Noble | Jan. 18, 1949 |
| 2,528,206 | Beveridge | Oct. 31, 1950 |